United States Patent
Small

(10) Patent No.: US 6,486,827 B2
(45) Date of Patent: Nov. 26, 2002

(54) SPARSE FREQUENCY WAVEFORM RADAR SYSTEM AND METHOD

(75) Inventor: James G. Small, Tucson, AZ (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/837,679

(22) Filed: Apr. 18, 2001

(65) Prior Publication Data
US 2002/0154054 A1 Oct. 24, 2002

(51) Int. Cl.⁷ .............................. G01S 7/282; G01S 7/28
(52) U.S. Cl. ..................... 342/201; 342/13; 342/82; 342/202; 455/91; 455/101; 455/103
(58) Field of Search ............... 342/27, 28, 72–103, 342/175, 192, 193–197, 13, 159, 165, 173, 174, 14–20, 60, 200–205; 455/103, 91, 101, 119

(56) References Cited

U.S. PATENT DOCUMENTS

| | | |
|---|---|---|
| 4,068,235 A | 1/1978 | Peters, Jr. et al. |
| 4,130,821 A | 12/1978 | Goldie |
| 4,328,497 A | 5/1982 | Vale |
| 4,358,766 A | 11/1982 | Mehron |
| 5,146,616 A * | 9/1992 | Tang et al. .................. 455/103 |
| 5,239,309 A * | 8/1993 | Tang et al. .................... 342/13 |
| 5,959,573 A | 9/1999 | Krikorian et al. |

* cited by examiner

Primary Examiner—Bernarr E. Gregory
(74) Attorney, Agent, or Firm—Renner, Otto, Boisselle & Sklar

(57) ABSTRACT

A radar for locating and tracking objects based on the use of a pulsed waveform, each pulse of the pulsed waveform being made up of a plurality of spectral components having different frequencies, including an antenna. The radar further includes a transmitter operatively coupled to the antenna for generating the plurality of spectral components that make up each pulse of the pulsed waveform and a receiver operatively coupled to the antenna for receiving signals at the frequencies of the plurality of spectral components. The radar also includes a signal processor operatively coupled to the receiver for processing the received signals in order to generate and output a radar presentation and to detect the presence of other signals at particular frequencies, a display operatively coupled to the signal processor for displaying the radar presentation, and finally a controller operatively coupled to the transmitter and the signal processor for varying the frequencies at which the plurality of spectral components are generated, such that the transmitter generates spectral components at frequencies different from the frequencies of other signals detected by the signal processor.

19 Claims, 5 Drawing Sheets

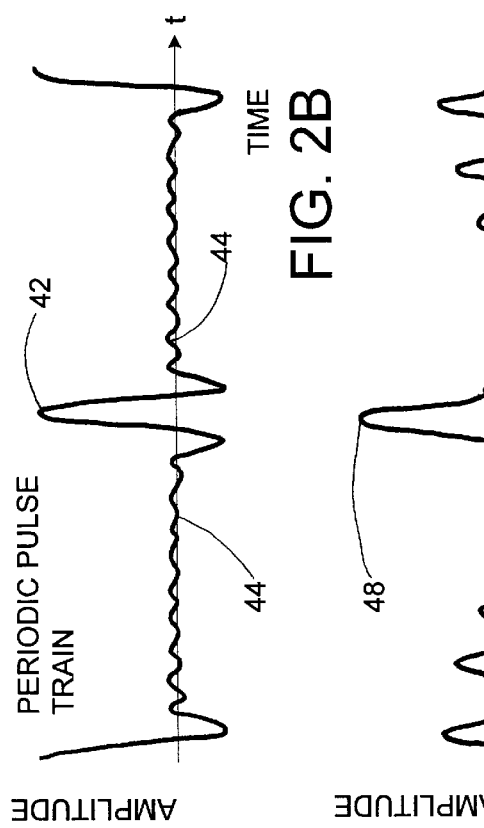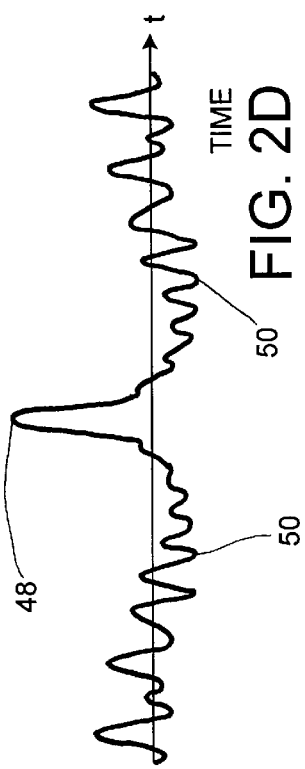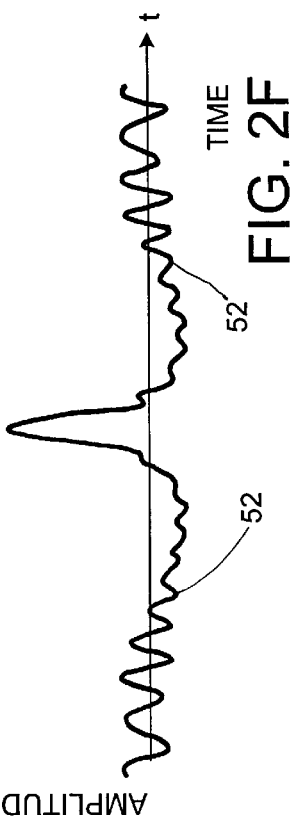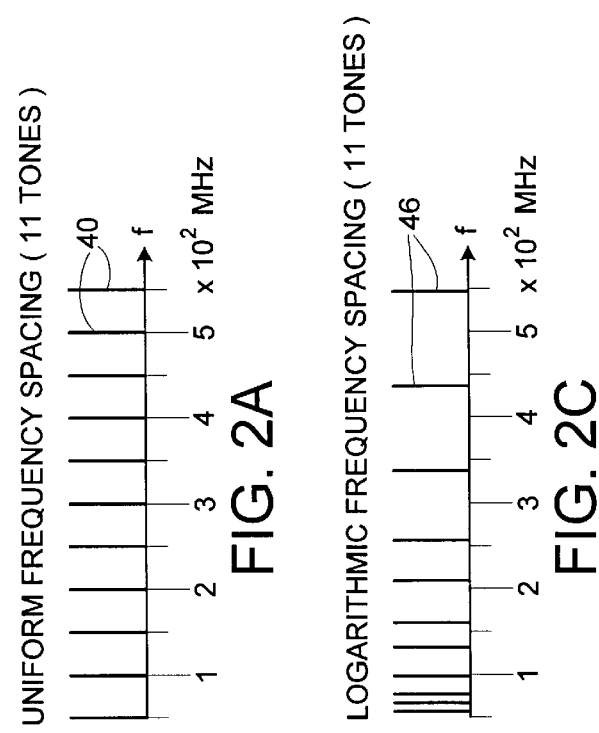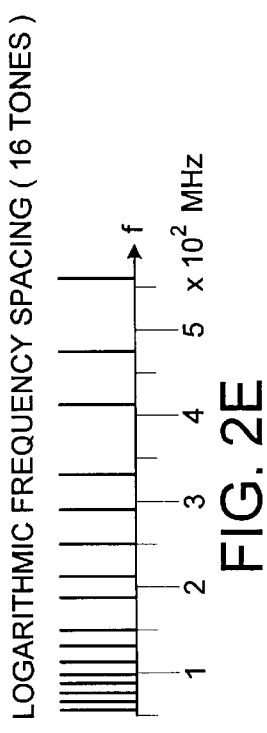

SPARSE FREQUENCY WAVEFORM RADAR SYSTEM AND METHOD

TECHNICAL FIELD

The present invention relates generally to a radar system and a method of generating waveforms for use by the radar system. More particularly, the present invention relates to an impulse radar system that generates individual pulses of a pulsed waveform from spectral components having frequencies that vary between individual pulses.

BACKGROUND OF THE INVENTION

Radar systems generally require bandwidth in order to resolve targets, i.e., the larger the bandwidth, the higher the range resolution. Conventional radar systems use waveforms with long pulse width and typically have an instantaneous bandwidth on the order of 100 MHz. To improve the instantaneous bandwidth, exploration has been done in connection with impulse radars. Impulse radars use a train of short pulses on the order of 200 picoseconds and have been shown to have an instantaneous bandwidth on the order of 5 GHz.

In the past, impulse radars have taken the approach of switching the RF transmit signal on and off in picoseconds in order to generate the train of extremely short pulses. However, such systems generally require the impulse generator to have a peak power on the order of several megawatts due to the fact that it has a low duty factor in that the pulse width of the impulse generator is extremely short when compared to the required interpulse period.

In an effort to ameliorate these problems, the inventor of the present invention explored an ultra-wide bandwidth radar that used a specified set of narrow band spectral components to synthesize a waveform with very high range resolution. This concept, which was embodied in U.S. Pat. No. 5,146,616 (the '616 patent) and U. S. Pat. No. 5,239,309 (the '309 patent), was implemented by combining (summing) multiple continuous wave sources having frequencies that were equally spaced. This superposition of continuous wave sources resulted in the desired repeating pulse train without the need for fast switching circuits. However, the waveform described in the aforementioned patents required that the transmitted sources be evenly spaced across at least a portion of the available frequency spectrum.

Recently, a need has been expressed for a radar system that could operate in the communication bands, e.g., from 3 Mhz to 1 GHz (covering HF, VHF, and UHF bands). Such a radar would be quite useful, particularly since it would have superior foliage penetration to radars operating at microwave frequencies and above. Unfortunately, the impulse radars of the prior art, including those covered by the '616 patent and the '309 patent, would not be suitable for such operation. Specifically, the prior art impulse radar systems are likely to interfere with communication signals being transmitted in the band of operation of the radar.

Therefore, it would be advantageous to have a radar system that could operate in the communication bands without interfering with other users transmitting within these bands.

SUMMARY OF THE INVENTION

The present invention provides a radar system that uses a wide bandwidth pulsed signal that is composed of spectral components having frequencies spaced at irregular intervals. Specifically, the present invention provides a radar system that is capable of varying the frequencies of the spectral components composing individual pulses of the pulsed signal so as to avoid interfering with ongoing communications within the radar's transmission band.

In accordance with one aspect of the present invention, a radar for locating and tracking objects based on the use of a pulsed waveform, each pulse of the pulsed waveform being made up of a plurality of spectral components having different frequencies is provided. The radar includes an antenna and a transmitter operatively coupled to the antenna for generating the plurality of spectral components that make up each pulse of the pulsed waveform. The radar further includes a receiver operatively coupled to the antenna for receiving signals at the frequencies of the plurality of spectral components and a signal processor operatively coupled to the receiver for processing the received signals in order to generate and output a radar presentation and to detect the presence of other signals at particular frequencies. The signal processor is operatively coupled to a display for displaying the radar presentation. Finally, the radar includes a controller operatively coupled to the transmitter and the signal processor for varying the frequencies at which the plurality of spectral components are generated, such that the transmitter generates spectral components at frequencies different from the frequencies of other signals detected by the signal processor.

In accordance with another aspect of the present invention, a radar is provided wherein the controller suppresses the generation of those spectral components having frequencies that are the same as the frequencies of the other signals detected by the signal processor.

In accordance with still another aspect of the present invention, a radar is provided wherein the spectral components are produced at frequencies within a frequency band of between approximately 20 MHz and approximately 600 MHz.

In accordance with still a further aspect of the present invention, a method of generating a pulsed waveform having a plurality of spectral components is provided. The method includes the steps of listening across a predetermined frequency band in order to determine which frequencies within the frequency band are available for transmission and generating for a finite period of time a plurality of spectral components having frequencies corresponding to at least a portion of the frequencies available for transmission. The method further includes the steps of combining the plurality of spectral components into a pulse of the pulsed waveform, transmitting the pulse of the pulsed waveform, and repeating the prior steps to generate and transmit a plurality of subsequent pulses of the pulsed waveform.

BRIEF DESCRIPTION OF THE DRAWINGS

FIG. 2A is a frequency domain representation of uniformly frequency spaced continuous wave sources, which when summed together create the pulsed waveform illustrated in FIG. 2B.

FIG. 2B is a time domain representation of the pulsed waveform created by summing the continuous wave sources represented in FIG. 2A.

FIG. 2C is a frequency domain representation of eleven logarithmically frequency spaced continuous wave sources, which when summed together create the pulsed waveform illustrated in FIG. 2D.

FIG. 2D is a time domain representation of the pulsed waveform created by summing the continuous wave sources represented in FIG. 2C.

FIG. 2E is a frequency domain representation of sixteen logarithmically frequency spaced continuous wave sources, which when summed together create the pulsed waveform illustrated in FIG. 2F.

FIG. 2F is a time domain representation of the pulsed waveform created by summing the continuous wave sources represented in FIG. 2E.

DESCRIPTION OF THE PREFERRED EMBODIMENTS

Figure 1:
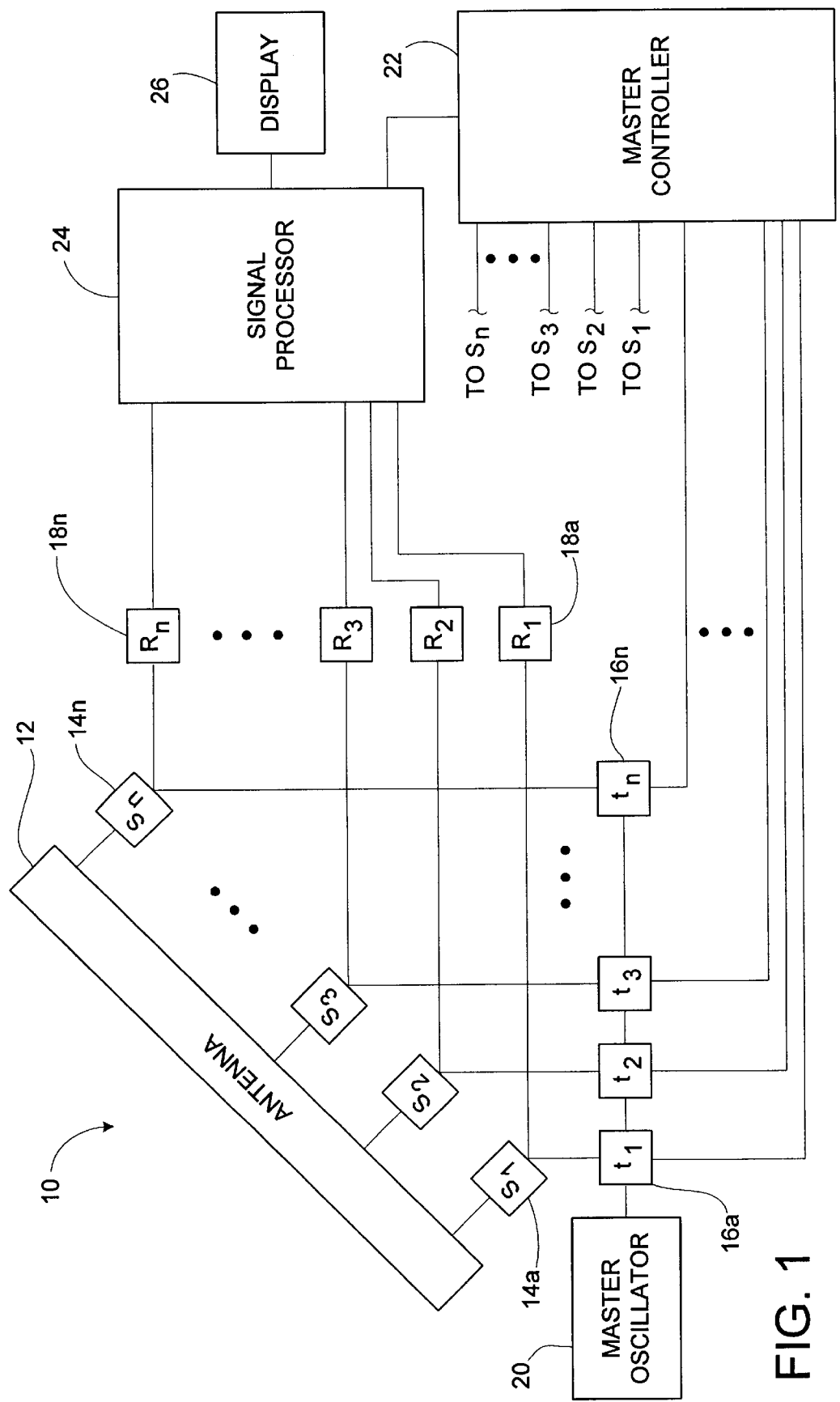
FIG. 1 is a simplified block diagram illustrating a radar system in accordance with the present invention.

The present invention will now be described in detail with reference to the drawings. In the drawings, like reference numerals are used to refer to like elements throughout.

FIG. 1 is a block diagram representation of a radar system 10 in accordance with the present invention. The radar system 10 includes an antenna 12 coupled to a plurality of switches 14a–14n. The switches 14a–14n are of the single-pole double-throw variety and operate to connect electrically the antenna 12 to both a series of transmitters 16a –16n and a series of receivers 18a–18n. The transmitters 16 are driven by a common master oscillator 20 and are connected to a master controller 22, the function of which will be described in more detail below. The master controller 22 is also connected to the switches 14 and a signal processor 24. In turn, the signal processor is connected to both the receivers 18 and a display 26.

Referring now to FIGS. 2A–2F, the waveforms generated by the radar system 10 will be discussed in more detail. For simplicity, the discussion will be confined to a frequency band between 50 MHz and 550 MHz, although any frequency band could be used without departing from the scope of the present invention. FIG. 2A is representative of 11 continuous wave (CW) sources 40 of equal amplitude but uniformly spaced in frequency across the frequency band. These 11 CW sources 40 make up the spectral components of the waveform represented in FIG. 2B. As discussed previously, it was found that when these 11 sources were summed together, the result was a waveform having a strong central peak 42 with noisy time-domain side lobes 44 mirrored about the central peak 42.

As is shown in FIGS. 2C–2H, a similar waveform is generated when summing or combining CW sources that are not uniformly spaced in frequency. FIG. 2C illustrates 11 CW sources 46, which are logarithmically spaced in frequency. As is illustrated in FIG. 2D, when these sources 46 are combined, the resulting waveform contains a strong central peak 48 with noisy time-domain lobes 50 mirrored about the central peak, although the time-domain side lobe structure does differ from the side lobe structure illustrated in FIG. 2B. Similarly, when 16 tones or CW sources are combined that are logarithmically spaced in frequency (See FIG. 2E), a waveform similar to the waveform illustrated in FIG. 2O (see FIG. 2F) is generated. As is readily seen, the time-domain side lobes 52 are of lesser amplitude than the time-domain side lobes 50 illustrated in FIG. 2D. It should be noted that as the number of tones or CW sources used to generate the transmitted waveform is increased, the relative strength (amplitude) of the time-domain side lobes decreases as compared to the central peak (See FIGS. 2D and 2F).

Ultimately, the inventor of the present invention determined that there need not even be a mathematical correlation for the frequencies of the tones or CW sources combined to generate a waveform that could be used by the radar system 10. The tones could be randomly spaced in frequency and the resulting waveform would still contain a strong central peak with noisy time-domain side lobes mirrored thereabout. The only requirement is that the tones used to generate the waveform be derived from a common master oscillator, i.e., that the tones be mutually coherent.

Referring back to FIG. 1, the basic operation of the radar system 10 will be described. As is the case with all radar systems, radar system 10 operates in both a transmission mode and a receive mode. To transmit a signal, the master controller 22 places switches 14a–14n in an appropriate position to connect electrically the antenna 12 and the transmitters 16a–16n. The transmitters 16 each act as a single CW source. Each signal produced by the transmitters 16 is coherently generated from the master oscillator 22 and provided to the antenna 12. In this embodiment of the present invention, each signal is generated for a period of 0.33 milliseconds, although other generation time periods could be used if an application required a longer pulse train. In other words, the "on" time of the transmitter 16 corresponds to the pulse duration for each individual pulse in the pulsed waveform.

The antenna 12, which is preferably a broadband multiplexing antenna, receives the signals generated by the transmitters 16 and combines them into a high gain beam. The master controller 22 controls the "on" time of the transmitters 16. After the "on" time has expired, the master controller 22 shuts down the transmitters 16 and shifts the switches 14a–14n into the appropriate position for the radar system 10 to act in a receive mode.

On receive, the antenna 12 separates all of the spectral components of the incoming waveforms. The spectral components are then coupled to the plurality of receivers 18a–18n. The receivers 18, the operation of which will be described in more detail below, each provide an output to the signal processor 24, which coherently combines and processes the outputs in order to produce a signal that is provided to the display 26, thereby creating a radar presentation. In this embodiment, the radar system 10 functions in the receive mode for a period of 50 milliseconds. Generally, the "off" time for the transmitters will correspond to the range of the radar system 10. Specifically, the "off" time should be sufficient to ensure that all return pulses have been received, thereby negating the potential for antenna 12 to receive and transmit simultaneously.

As was discussed above, the number or density of the spectral components combined in order to create the pulsed waveform influences the strength of the time domain side lobes of the pulsed waveform in comparison to the central peak. Therefore, if the spectral components are densely frequency spaced, the pulsed waveform reduces to a single transmitted impulse without side lobes. Although such a waveform may be ideal, it is not necessary to achieve the benefits of the present invention. For example, the present radar system 10 can be effective when using 20 to 40 spectral components.

Figure 3:
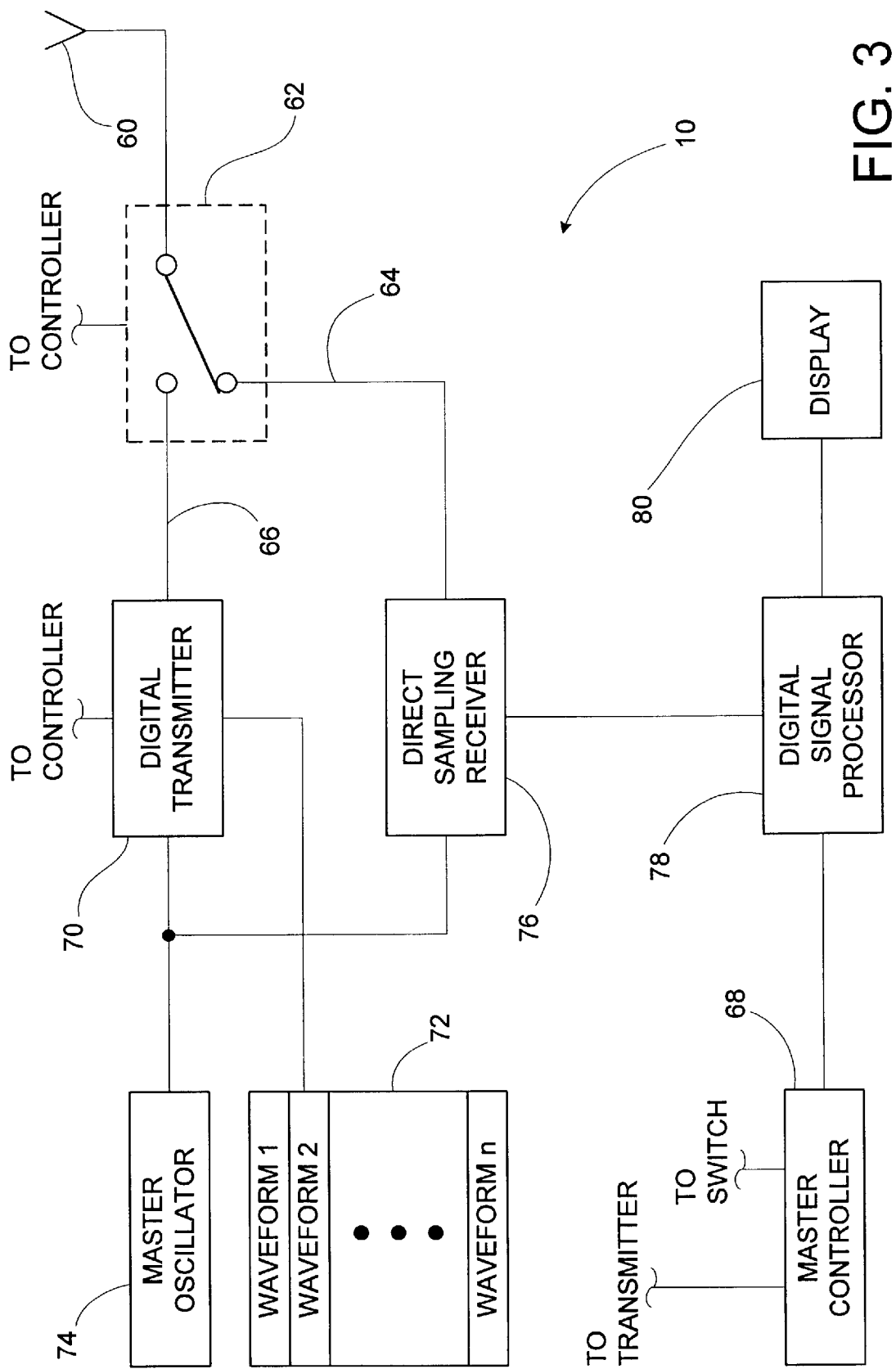
FIG. 3 is a simplified block diagram of a digital implementation of a radar system in accordance with the present invention.

Turning now to FIG. 3, a digital implementation of the radar system 10 is illustrated. The radar system 10 includes a broadband multiplexing antenna 60 electrically connected to a single-pole double-throw switch 62. The switch 62 is illustrated electrically connected to a receive path 64. However, the switch 62 will toggle between the receive path 64 and a transmit path 66 in response to commands from a master controller 68.

When toggled into connection with the transmit path 66, the switch 62 couples the antenna 60 to a digital transmitter 70. In the illustrated embodiment, the digital transmitter 70 is in communicative relation with both a memory 72, which stores digitally synthesized waveforms, and a master oscillator 74, which functions as a master clock for the radar system 10. In response to commands from the master controller 68, the digital transmitter 70 selects the appropriate waveform for transmission.

As will be discussed in more detail by reference to FIG. 5, the waveform will be selected based upon the spectral components available for transmission, i.e., those spectral components that will not interfere with other communication ongoing within the transmission band of the radar system 10. The memory 72 may contain digital representations of the actual waveforms to be transmitted. Alternatively, the memory 72 may contain digital representations of individual spectral components. In this case, the digital transmitter 70 would select the appropriate spectral components from the memory 72 and digitally synthesize therefrom the waveform to be transmitted.

When toggled into connection with the receive path 64, the switch 62 couples the antenna 60 to a direct sampling receiver 76. The direct sampling receiver 76 samples received signals in order to generate data that will be used by a digital signal processor 78 which is coupled to the direct sampling receiver 76. In this embodiment of the present invention, a sample rate of 1 gigasample per second would be sufficient to capture information on the received signals.

As is the case with conventional radar systems, the digital signal processor 78 processes the information provided by the direct sampling receiver 76 in order to generate a radar presentation that the digital signal processor 78 then provides to a display 80.

Figure 4:
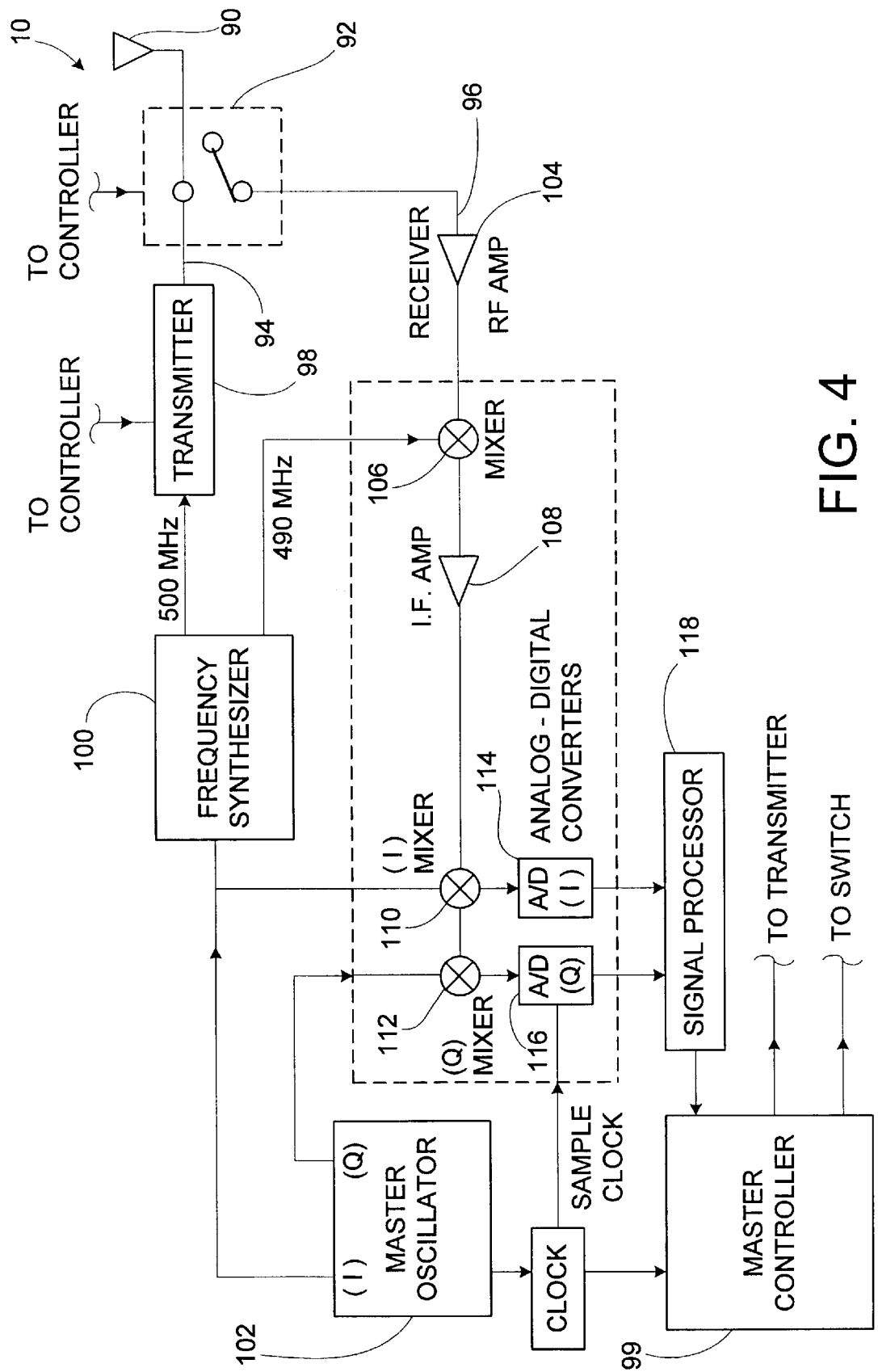
FIG. 4 is a schematic illustration of an analog implementation of one channel of a radar system in accordance with the present invention.

Referring now to FIG. 4, the present invention, if desired, could also be implemented in analog circuitry. FIG. 4 represents an analog implementation of one channel or tone of the present invention. One skilled in the art will appreciate that this implementation will be repeated for each channel of the radar system 10. To the extent practical, certain of the components may be common to each such channel.

As with the digital implementation described above, an antenna 90 is coupled via a switch 92 to both a transmit path 94 and a receive path 96. When connected to the transmit path 94, the switch 92 couples the antenna 90 to a transmitter 98 that is controlled by a controller 99. The transmitter 98 is driven by a frequency synthesizer 100 so as to create a spectral component having a particular frequency. As was discussed previously, it is desirable that each CW source be coherently generated. Accordingly, the frequency synthesizer 100 is connected to a master oscillator 102, which synchronizes the generation of the CW sources for all channels of the radar system 10.

When connected to the receive path 96, the antenna 90 is coupled to an RF amplifier 104 to detect and amplify spectral components of the received signals. The RF amplifier 104 is connected to a mixer 106, which mixes the output signal of the RF amplifier 104 with a signal from the frequency synthesizer 100. The signal from the frequency synthesizer provided the mixer 106 is offset in frequency from the signal the RF amplifier 104 provides the mixer 106 by an amount equal to the frequency of the master oscillator 102.

The mixer 106 outputs a signal to an intermediate frequency amplifier 108, which provides an amplified output to both in-phase mixer 110 and quadrature mixer 112. In-phase mixer 110 and quadrature mixer 112 mix the amplified output with a signal from the master oscillator 102 and provide respective outputs to an in-phase A/D converter 114 and a quadrature A/D converter 116.

The in-phase A/D converter 114 and the quadrature A/D converter sample the outputs from mixers 1 10 and 112 and provide I and Q data to a digital signal processor 118 for use in creating a radar presentation. In accordance with the Nyquist criterion, the A/D converters 114 and 116 must sample at a sufficient rate to capture available information from the received signals. Generally, a sampling rate of 8 kHz would be adequate in the present embodiment of this invention.

Figure 5:
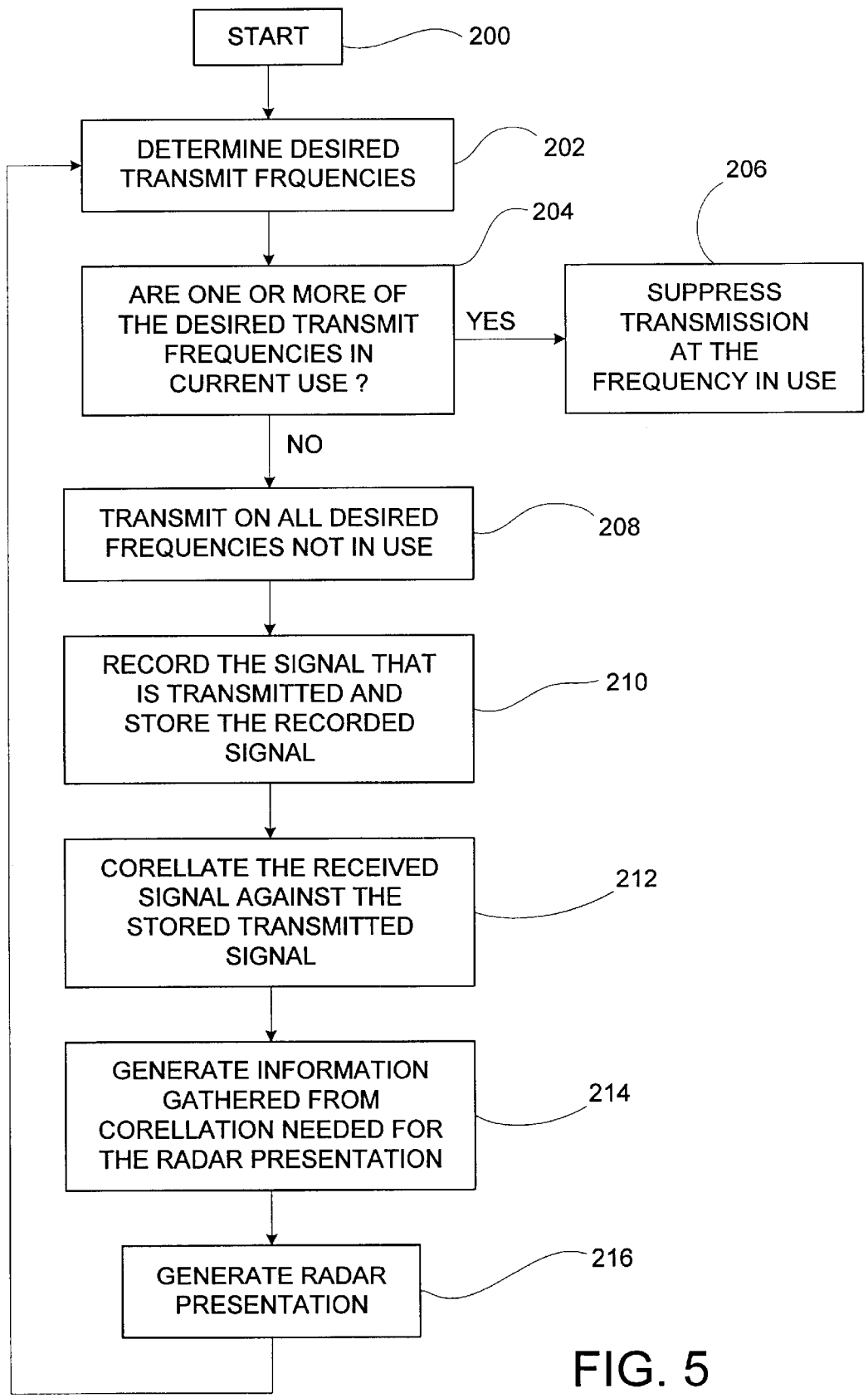
FIG. 5 is a flow chart illustrating the steps performed by a radar system in accordance with the present invention.

Referring now to FIG. 5, the operation of a radar system in accordance with the present invention will be described. In step 200, the system commences operation and, in step 202, initially determines the frequencies within the frequency band of the spectral components that will form a pulse of the pulsed waveform. The frequencies could be static or dynamic. In other words, the system could be built such that it included a plurality of transmitters (on the order of 20 to 40), each transmitter designed to generate a continuous wave signal at a predetermined frequency. Alternatively, the system could be designed such that the frequencies at which the transmitters generate the signal vary based upon information received from other components in the system.

In step 204, the system is set to operate in the receive mode, and listens across at least a portion of the frequency band in which the system is designed to operate in order to detect the presence of signals at the same frequencies as the desired frequencies for the spectral components. If the system detects the presence of signals at the desired frequencies, the controller will send a signal to the applicable transmitters, thereby suppressing the generation of that spectral component (see step 206). Then, as indicated in step 208, the system is switched to the transmit mode and the remaining spectral components, i.e., the spectral components having frequencies not conflicting with other signals within the operational range of the radar system, are transmitted.

As discussed previously, eliminating one or more of the spectral components that make up a pulse results in an increase of the relative strength of the time-domain side lobes as compared to the main lobe, thereby degrading the "quality" of the pulse. This degradation is generally quite slight and should not impact adversely the operation of the radar system. However, as opposed to suppressing one or more of the spectral components, the system could be configured to provide a predetermined number of spectral components, the frequencies of which vary from pulse to pulse based upon the frequencies within the band available for transmission. This "frequency hopping" would reduce both the likelihood of repetitively being unable to transmit and the ability of a third party to jam this radar system.

In step 210, the signal that is transmitted by the antenna is recorded and stored for use by the signal processing electronics. In step 212, the system switches back to the receive mode and listens for the return signals. The return signals that are received are provided to the signal processor and correlated against the transmitted signal, as recorded. The basic purpose of the correlation function is to match the received signals to the transmitted signal. As is indicated in steps 214 and 216, the information generated by this "matching" is used to create the impulse response or "A-scope" response of the radar system, which is in turn used in a conventional manner to generate the radar presentation or display.

The correlation of the received to the transmitted signal may be complicated by the Doppler shift created in the returned signals. One potential method of addressing such complication would be to correlate the received waveform against a plurality of trial Doppler-shifted transmitted waveforms, using the results of such correlations to create the impulse response of the radar system.

Steps 202 through 216 are then repeated to create subsequent pulses of the pulsed waveform. Generally, it is anticipated that each pulse will be made up of a superposition of spectral components having frequencies that vary from the frequencies of the spectral components making up one or more of the previous pulses. In this manner, a radar system is provided which employs a signal having spectral components that will not interfere with other communication signals being transmitted. Thus, the present system can be employed in any frequency bands including communication frequency bands. Furthermore, because the spectral components of each pulse will likely vary, a radar system is provided which is very difficult to jam since any jamming scheme will need to know exactly which frequencies will be received by the system at a precise point in time.

Although the invention has been shown and described with respect to certain embodiments, it is obvious that equivalents and modifications will occur to others skilled in the art upon the reading and understanding of the specification.

What is claimed is:

1. A radar for locating and tracking objects based on the use of a pulsed waveform, each pulse of the pulsed waveform being made up of a plurality of spectral components having different frequencies, comprising:
   (a) an antenna;
   (b) a transmitter operatively coupled to the antenna for generating the plurality of spectral components;
   (c) a receiver operatively coupled to the antenna for receiving signals at the frequencies of the plurality of spectral components;
   (d) a signal processor operatively coupled to the receiver for processing the received signals in order to generate and output a radar presentation and to detect the presence of other signals at particular frequencies;
   (e) a display operatively coupled to the signal processor for displaying the radar presentation; and
   (f) a controller operatively coupled to the transmitter and the signal processor for varying the frequencies at which the plurality of spectral components are generated in response to information received from the signal processor, such that the transmitter generates spectral components at frequencies different from the frequencies of other signals detected by the signal processor.

2. A radar according to claim 1, wherein each spectral component is generated at a predetermined frequency.

3. A radar according to claim 2, wherein the controller suppresses the generation of those spectral components having frequencies that are the same as the frequencies of the other signals detected by the signal processor.

4. A radar according to claim 1, wherein the spectral components are produced at frequencies within a predetermined frequency band.

5. A radar according to claim 4, wherein the spectral components are irregularly spaced in terms of frequency across at least a portion of the predetermined frequency band.

6. A radar according to claim 4, wherein the predetermined frequency band is between approximately 20 MHz and approximately 600 MHz.

7. A radar according to claim 1 including a plurality of transmitters and a plurality of receivers, each of the plurality of transmitters for generating one of the plurality of spectral components and each of the plurality of receivers for receiving signals at the frequency one of the plurality of spectral components.

8. A radar according to claim 7, wherein the plurality of transmitters include a master oscillator whereby the spectral components are coherently produced by the plurality of transmitters.

9. A radar according to claim 1, wherein the transmitter is a digital transmitter, which digitally synthesizes each pulse of the pulsed waveform.

10. A radar according to claim 9, wherein the receiver is a direct sampling receiver.

11. A radar according to claim 10, wherein the direct sampling receiver has a sample rate of approximately 1 GS/s.

12. A radar according to claim 1, wherein the antenna is a broadband multiplexing antenna.

13. A radar according to claim 1, wherein the signal processor includes means for generating a received pulsed waveform from the spectral components received by the receiver.

14. A radar according to claim 13, further comprising a recorder for recording each pulse of the pulsed waveform.

15. A radar according to claim 14, wherein the signal processor includes means for correlating the recorded pulsed waveform and the received pulsed waveform in order to generate an impulse response of the radar.

16. A radar according to claim 15, wherein the signal processor uses the impulse response of the radar to generate the radar presentation.

17. A method of generating a pulsed waveform having a plurality of spectral components for use in a radar system, comprising the steps of:
   (a) listening across a predetermined frequency band;
   (b) determining which frequencies within the frequency band do not contain a signal and are thereby available for transmission;
   (c) generating for a finite period of time a plurality of spectral components having frequencies corresponding to at least a portion of the frequencies available for transmission;
   (d) combining the plurality of spectral components into a pulse of the pulsed waveform;
   (e) transmitting the pulse of the pulsed waveform; and
   (f) repeating steps (a)–(e) to generate and transmit a plurality of subsequent pulses of the pulsed waveform.

18. A method according to claim; 17, wherein the frequencies of the spectral components combined to form the pulse vary from the spectral components combined to form at least one of the plurality of subsequent pulses of the pulsed waveform.

19. A method according to claim 17, wherein the spectral components are generated at irregularly spaced frequencies.

* * * * *